No. 680,150. Patented Aug. 6, 1901.
C. A. W. HULTMAN.
ELECTRIC CABLE.
(Application filed Mar. 23, 1901.)
(No Model.) 2 Sheets—Sheet 1.
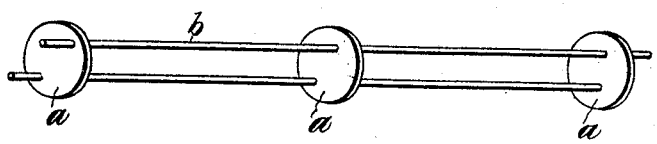
Fig. 1.
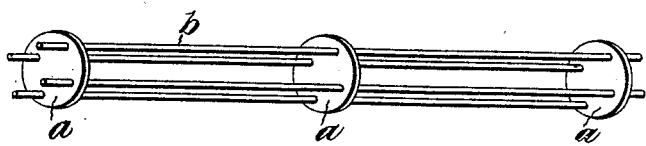
Fig. 2.
Fig. 5.
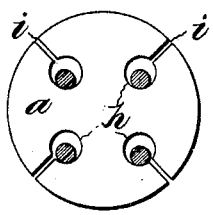
Fig. 3. Fig. 4.
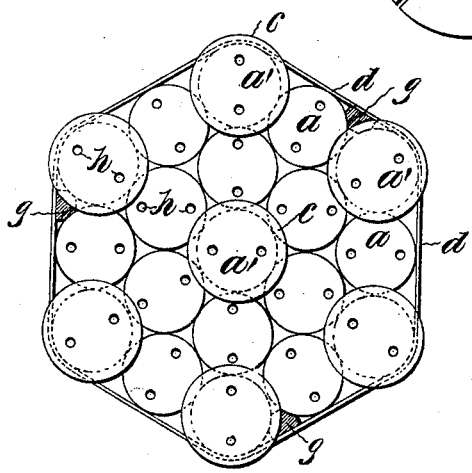
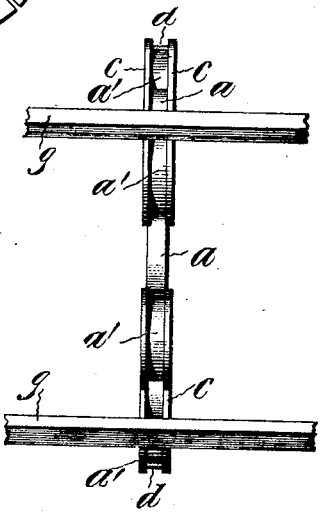
Fig. 6.
Witnesses:
Inventor,
Carl Axel Wilhelm Hultman,
by
Atty.

No. 680,150. Patented Aug. 6, 1901.
C. A. W. HULTMAN.
ELECTRIC CABLE.
(Application filed Mar. 23, 1901.)
(No Model.) 2 Sheets—Sheet 2.
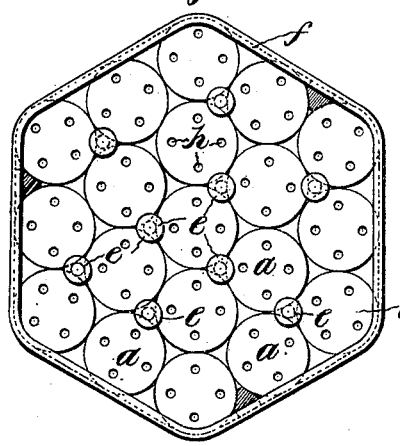
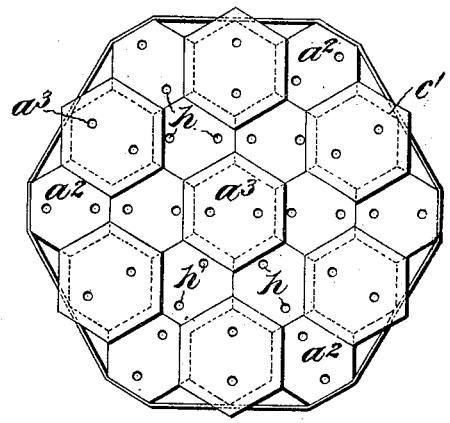
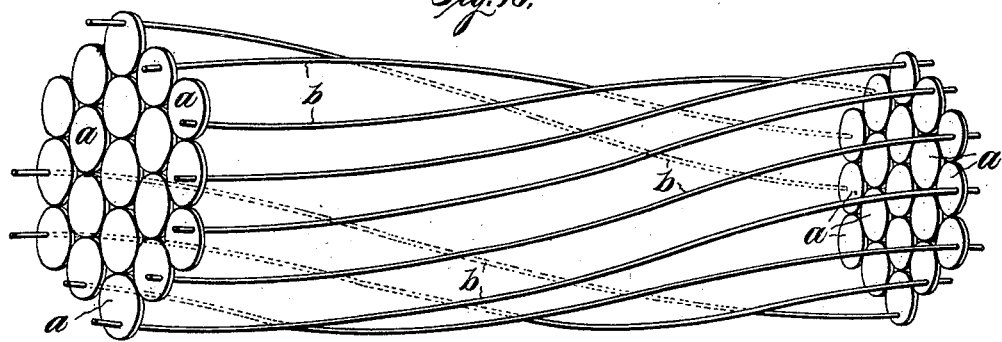
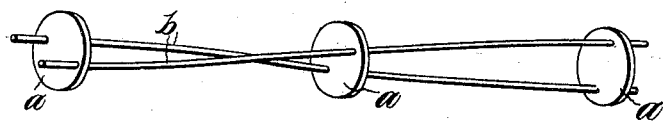
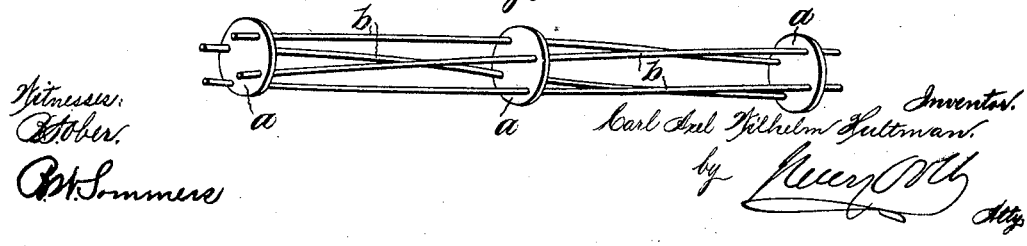

UNITED STATES PATENT OFFICE.

CARL A. W. HULTMAN, OF STOCKHOLM, SWEDEN.

ELECTRIC CABLE.

SPECIFICATION forming part of Letters Patent No. 680,150, dated August 6, 1901.

Application filed March 23, 1901. Serial No. 52,542. (No model.)

*To all whom it may concern:*

Be it known that I, CARL AXEL WILHELM HULTMAN, a subject of the King of Sweden and Norway, residing at Stockholm, in the Kingdom of Sweden, have invented certain new and useful Improvements in Electric Cables; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the manufacture of electric cables, and has for its object the making of such cables so that their connecting-wires will be air-insulated, such insulation being useful in cables where induction is to be avoided as much as possible; and it consists, essentially, in stringing wires through insulating elements sufficiently distanced from one another and arranged to hold all the wire strands parallel or hold them parallel in pairs and when desired to give all the wires the required twist, such as they would receive in ordinary cables.

Referring to the drawings, in which like parts are similarly designated, Figure 1 shows a pair of wires strung through three carriers or insulators. Fig. 2 shows similar carriers with four wires. Fig. 3 is a front view of a series of assembled insulating-supports; and Fig. 4 is an edge view of Fig. 3, showing rails for connecting different series. Fig. 5 shows a slotted disk. Fig. 6 is a view of one of the connecting-spools. Fig. 7 is a view showing a series of disks held by the spools shown in Fig. 6. Fig. 8 is an edge view of Fig. 7; Fig. 9, a series of hexagonal insulators. Fig. 10 shows the outer wires of a cable between two series of insulators arranged in helical form. Fig. 11 shows two, and Fig. 12 shows four, wires relatively twisted.

I provide as a support suitably-formed insulating-pieces $a$, which are preferably, though not necessarily, of regular geometrical form and sufficiently thick to serve the purpose. These pieces can be formed of any desired insulating material, such as porcelain, fiber, celluloid, wood, or equivalent material. In Fig. 1 I have shown three of these supports or insulators $a$, provided with two perforations each, which serve to support a two-wire line, and in Fig. 11 these wires are shown twisted or helically wound by giving the supports $a$ different angles of rotation with respect to their axes. In Fig. 2 these insulators or cables $a$ are shown as provided with four perforations and carrying four wires $b$, these wires being given helical form, as shown in Fig. 12. I do not limit myself to the number of wires carried by an insulator nor to the size of this insulator, as they may be made any size and carry any suitable number of wires to be determined by the requirements of construction.

In Fig. 3 I have shown the carriers as disks $a$, held together by similar ones $a'$, which latter are provided with flanges $c$ on either side, so as to give them a spool form. These insulators $a'$ serve to hold those $a$ together, the disks $a$ fitting between the flanges $c$ on the insulators $a'$ and the assembled series held together by means of a wire or metal strap $d$, which is passed around the assembled insulators and prevented from slipping off by the flanges $c$ of the insulators $a'$. I have shown these disks and spools carrying their pairs of wires in different relative positions. The twist can be given by means of the several wires having first been wound together in a cable or other twisting machine and strung through the insulators placed at suitable distances apart, or the wires may be strung parallel and the disks or all the disks of a series given a partial twist.

In Fig. 7 I have shown all the disks $a$ as held together by small spools $e$, (shown in Fig. 6,) which may or may not have perforations to receive wires, the assembled insulators $a$ being held together and in a plane by means of a channel-shaped strip of metal $f$. When found desirable, I may supplement this method of placing the cables together by lateral strips of metal or wood $g$, extending the length of the cable and giving it rigidity and enabling it to be quite easily handled, which strips also serve to prevent the rotation of the disks $a$ upon their centers. These strips are inserted, preferably, though not necessarily, at the outer portions of the assembled insulators and held in place by the same wire $d$ or channel-strip $f$ that binds a series of carriers together. In Fig. 9 I have shown another regular form (hexagonal) held together in a similar manner, the flat hexagons $a^2$ being similar to the disks $a$, and the spool-shaped ones $a^3$ are provided with flanges $c'$ for locking the series together. Each of these hexagonal plates can be rotated thirty degrees or multiples thereof to give the wires the required twist to avoid parallel currents and induction.

In Fig. 5 I have shown a plate $a$ of celluloid or other flexible material of disk form and provided with four perforations $h$ and slots $i$, here shown as radial slots extending from the periphery of the plate to the perforations and of course narrower than the diameter of the perforations or the wire to be carried. This form avoids the necessity of stringing the wires through the perforations, as it will suffice to bend the disk on either side of the slot to open it sufficiently to insert the wire, and when pressure is released the edges of the slot will spring back into normal position, the slot being sufficiently narrow to prevent the wire from dropping out. The spool-shaped plates are of course similarly slotted.

Having thus described my invention, what I claim as new therein, and desire to secure by Letters Patent, is—

1. An electric cable comprising wire-supports each composed of a plurality of perforated insulating-plates arranged edge to edge, means for locking said plates together and wires threaded through the perforations of the plates, for the purpose set forth.

2. An electric cable, comprising a plurality of wires air-insulated from one another and helically twisted, substantially as described.

3. An electric cable comprising wire-supports each composed of a plurality of perforated insulating-plates arranged edge to edge, means for locking the plates together and wires threaded through the perforations of the plates and twisted, for the purpose set forth.

4. An electric cable comprising wire-supports each composed of a plurality of edge-interfitting insulated plates having spaced perforations and constructed to form tie-grooves about the outer edges of the group of plates, means for tying said group of plates together, and wires threaded through the perforated plates, for the purposes set forth.

5. An electric cable comprising wire-supports each composed of a plurality of insulating-plates provided with spaced perforations and arranged concentrically, means for locking the plates together and one or more pairs of wires threaded through the perforations of each of said plates, for the purposes set forth.

6. An electric cable comprising wire-supports each composed of a plurality of circular insulating-plates provided with spaced perforations and arranged concentrically and revolubly on and independently of one another, means for locking the group of plates together, and one or more pairs of wires threaded through perforations of each plate, for the purpose set forth.

7. An electric cable, comprising a plurality of wires air-insulated from one another and a plurality of perforated insulating-pieces of a form arranged to be interfitted, and means for holding said insulating-pieces together, substantially as described.

8. An electric cable, comprising a plurality of wires, insulating-pieces of regular form arranged to hold said wires in different relative positions to one another and means for holding said pieces together in a plane, substantially as described.

9. An electric cable, comprising a plurality of wires, a series of perforated insulating-pieces of regular form arranged to space said wires and a binding-strip surrounding said series of insulating-pieces to bind them together, substantially as described.

10. An electric cable, comprising a plurality of wires, a series of perforated disks for spacing said wires and spool-shaped pieces arranged between the disks to hold them in a plane and means for binding said disks together, substantially as described.

11. An electric cable, comprising a plurality of perforated disks and perforated spool elements coöperating with said disks to hold them in a plane, and a metallic binding-strip to hold said spools and disks together, substantially as described.

12. An electric cable, comprising a plurality of insulating-disks, each provided with one or more perforations, similar disks provided with flanges overlapping the adjoining disks and a metallic band for locking said disks together, substantially as described.

13. An electric cable, comprising a plurality of air-insulated wires, perforated disks for spacing said wires, perforated spool-shaped elements for locking said disks in a plane, and suitable longitudinal rods arranged to connect the several series of disks together and a binding-strip surrounding each series of disks, substantially as described.

14. An electric cable, comprising a plurality of air-insulated wires, a series of disks arranged in a plane to space said wires, a binding-strip securing said disks in a plane, and longitudinal rods connecting the series of disks, substantially as described.

15. An electric cable, comprising a plurality of air-insulated wires, perforated insulating-plates for spacing the wires from one another and slots from the periphery of said plates to the perforations, substantially as described.

16. A spool-shaped insulating-plate for electric cables, provided with two or more perforations to receive the wires of said cable, substantially as described.

17. A spool-shaped insulating-plate of regular form, provided with two or more perforations, substantially as described.

18. A hexagonal spool-shaped insulating-plate, provided with perforations, substantially as described.

In testimony that I claim the foregoing as my invention I have signed my name in presence of two subscribing witnesses.

CARL A. W. HULTMAN.

Witnesses:
PHILIP F. LARNER,
HENRY ORTH, Jr.